(12) United States Patent
Tailor

(10) Patent No.: US 7,613,425 B2
(45) Date of Patent: Nov. 3, 2009

(54) BLUETOOTH COMMUNICATIONS

(75) Inventor: Mahendra J Tailor, Middlesex (GB)

(73) Assignee: Ezurio Limited, London (GB)

( * ) Notice: Subject to any disclaimer, the term of this patent is extended or adjusted under 35 U.S.C. 154(b) by 437 days.

(21) Appl. No.: 11/006,520

(22) Filed: Dec. 7, 2004

(65) Prior Publication Data
US 2005/0186907 A1 Aug. 25, 2005

(30) Foreign Application Priority Data
Dec. 8, 2003 (GB) ............................... 0328435.3

(51) Int. Cl.
H04B 7/00 (2006.01)
(52) U.S. Cl. .................. 455/41.2; 455/556.1; 455/557; 370/338; 370/328; 370/469
(58) Field of Classification Search ................ 455/41.2, 455/11.1; 709/202
See application file for complete search history.

(56) References Cited

U.S. PATENT DOCUMENTS

| | | | | |
|---|---|---|---|---|
| 4,939,735 | A * | 7/1990 | Fredericks et al. .......... | 714/798 |
| 6,650,871 | B1 * | 11/2003 | Cannon et al. ............. | 455/41.2 |
| 6,968,153 | B1 * | 11/2005 | Heinonen et al. .......... | 455/11.1 |
| 7,071,898 | B2 * | 7/2006 | Hobgood et al. ............ | 345/7 |
| 7,423,999 | B2 * | 9/2008 | Tailor ...................... | 370/338 |
| 2002/0184299 | A1 * | 12/2002 | Chou et al. ................ | 709/202 |
| 2004/0198219 | A1 * | 10/2004 | Malmstrom et al. ......... | 455/41.1 |
| 2005/0048961 | A1 * | 3/2005 | Ribaudo et al. ............. | 455/419 |
| 2005/0059346 | A1 * | 3/2005 | Gupta et al. ............... | 455/41.2 |
| 2006/0034231 | A1 * | 2/2006 | Tailor ...................... | 370/338 |

FOREIGN PATENT DOCUMENTS

| | | | |
|---|---|---|---|
| EP | 1093272 A2 * | 4/2001 | |
| EP | 1 271 853 | 1/2003 | |
| EP | 1 271 853 A | 1/2003 | |
| WO | WO 01/03371 | 1/2001 | |
| WO | WO 01/03371 A | 1/2001 | |
| WO | WO 2004017575 A2 * | 2/2004 | |
| WO | WO 2006119563 A1 * | 11/2006 | |

OTHER PUBLICATIONS

J. Haartsen; *Bluetooth—The Universal Radio Interface for Ad Hoc, Wireless Connectivity*; 1998; pp. 110-117; No. 3; Stockholm, Sweden.
European Search Report for European Application No. 04257595.1; Filed Dec. 7, 2004; Date of Completion of Search Jul. 20, 2007.
Haartsen, J.: "*Bluetooth—The universal radio interface for ad hoc, wireless connectivity*"; Ericsson Review, Ericsson, Stockhold, SE, No. 3, 1998, pp. 110-117, XP000783249; ISSN: 0014-0171.

* cited by examiner

*Primary Examiner*—Matthew D. Anderson
*Assistant Examiner*—April S Guzman
(74) *Attorney, Agent, or Firm*—Alston & Bird LLP

(57) ABSTRACT

Bluetooth range extending apparatus is disclosed for extending the range of Bluetooth communication between a master and an associated slave device. The apparatus (2) comprises a first communication module (3) for receiving incoming Bluetooth signals carrying data and extracting the carried data, and a second communication module (3) for re-encoding the extracted data and transmitting corresponding outgoing Bluetooth signals.

8 Claims, 2 Drawing Sheets

BLUETOOTH COMMUNICATIONS

BACKGROUND TO THE INVENTION

This invention relates to Bluetooth communications and in particular to extending the range of Bluetooth communications.

Bluetooth is a low power radio protocol which is used to transfer data in the 2.4 GHz ISM (Industrial Scientific and Medical) band. Whilst Bluetooth is widely used and is very versatile, Bluetooth enabled devices tend to have limited range and where there is intervening structure or equipment between two communicating Bluetooth devices (Bluetooth peers) range can become restricted to the point that it is not a feasible form of communication in some circumstances. In particular, with the normal range provided by Bluetooth enabled devices it can be impossible to set up a wireless Bluetooth system to allow communication with devices spread out over a large factory or commercial premises.

There is a desire therefore for apparatus and methods which can be used to extend the range of Bluetooth communication.

In conventional radio communications repeaters are sometimes used in an effort to increase range. A radio repeater functions by detecting a weak radio signal with one antenna, reamplifyng and then transmitting the amplified signal from another antenna. However, in getting such a radio repeater to function there is a problem of ensuring that the receiver of the weak incoming radio signal does not pick up the boosted signal output from the other antenna. If this happens a positive feedback loop results. This means that no data gets transmitted and the end result is that the transmitting antenna transmits an ever increasing signal until it saturates. This phenomenon is known as self-oscillation.

The Bluetooth protocol allows a so-called piconet to be formed. A piconet is a collection of up to eight Bluetooth devices that can talk to one of their members which is defined as a master, while the other members are defined as slaves. Bluetooth also allows different piconets to connect to each other in order to share information between the piconets. When such piconets join together one device partakes in both piconets, but as a slave to the master of each. This means that information is only transferred across the piconets if that slave is interrogated and controlled by both masters. Thus, before any information can be transferred between the piconets, it is necessary for the master in the receiving piconet to interrogate the common slave to determine whether there is any information to be transferred.

It is an aim of the present invention to provide apparatus and methods for extending the range of Bluetooth communication between a master and slave device without the need for establishing advertising piconet group capabilities, coordinating Bluetooth transmitters, or scatternets.

SUMMARY OF THE INVENTION

According to one aspect of the present invention there is provided a method of extending the range of Bluetooth communication between a master and a slave device comprising the steps of receiving incoming Bluetooth signals carrying data; extracting the carried data, re-encoding the extracted data, and transmitting corresponding outgoing Bluetooth signals.

According to another aspect of the present invention there is provided Bluetooth range extending apparatus for extending the range of Bluetooth communication between a master and a slave device, the apparatus comprising a first communication module for receiving incoming Bluetooth signals carrying data and extracting the carried data and a second communication module for re-encoding the extracted data and transmitting corresponding outgoing Bluetooth signals.

The present invention allows an essentially open path of communication to be established between the master and slave devices even when those devices would otherwise be out of range.

By "master and associated slave device" it is meant that the slave device is a slave to that master. In this specification the term "data" should be read as including both data and voice as defined within the Bluetooth standard.

The present technique of repeating Bluetooth signals relies on the idea of decoding the incoming signals to obtain the underlying data and then re-encoding the data to generate outgoing Bluetooth signals. This is of course is quite distinct from the idea of trying to receive and repeat the RF (radio frequency) Bluetooth packets without decoding the signals to extract the data. The present technique may provide the following advantages.

The out going Bluetooth signals are, at any time, very likely to be at a different frequency than the incoming signals and even if the received signals and transmitted signals have the same frequency for a time this will almost certainly be short lived. This is because of the random frequency hopping nature of Bluetooth signals where each frequency hop has a duration of 625 microseconds and effectively prevents self-oscillation problems.

Further, as the data is digitally decoded and extracted before re-encoding for transmission there should be little or no degradation in the data as the result of the operation of the range extender. Amongst other things this can facilitate "daisy-chaining" range extenders/the range extending process.

The method may comprise the step of carrying out the steps of receiving incoming Bluetooth signals carrying data, extracting the carried data, re-encoding the extracted data, and transmitting corresponding outgoing Bluetooth signals successively at a plurality of locations.

According to another aspect of the present invention there is provided a method of extending the range of Bluetooth communication between a master and an associated slave device comprising the steps of:

at a first location, receiving incoming Bluetooth signals carrying data;

extracting the carried data;

re-encoding the extracted data; and transmitting corresponding outgoing Bluetooth signals; and at a second location, receiving said corresponding outgoing Bluetooth signals;

extracting the carried data from said corresponding outgoing Bluetooth signals;

re-encoding the extracted data; and transmitting respective corresponding outgoing Bluetooth signals.

According to another aspect of the present invention there is provided a Bluetooth range extending arrangement comprising a plurality of Bluetooth range extending apparatus of the type defined above.

The plurality of apparatus in such an arrangement may be disposed within an area also occupied by a plurality of Bluetooth devices and located so as to facilitate communication between the Bluetooth devices.

The plurality of apparatus in such an arrangement may be disposed so as to provide cumulative range extension such that the signals output by one range extending apparatus may be received and passed on by another range extending apparatus.

The first communication module may be a transceiver module which is arranged for transmitting Bluetooth signals as well as receiving Bluetooth signals. The second communication module may be a transceiver module which is arranged for receiving Bluetooth signals as well as transmitting Bluetooth signals. Where the modules are transceiver modules the range extender can be used to extend the range of a bi-directional Bluetooth connection.

Similarly the method may involve receiving and transmitting Bluetooth signals in two directions to provide extended range for a bi-directional Bluetooth connection.

There are a number of different ways in which the range extending apparatus may be structured, for example, whereas the first and second communication modules may exist as separate items of hardware in other cases common pieces of hardware may be used to provide at least some of the functionality of both modules.

The first communication module may comprise a Bluetooth serial adapter which is arranged to act as a translator between Bluetooth signals and serial signals. The second communication module may comprise a Bluetooth serial adapter which is arranged to act as a translator between Bluetooth signals and serial signals.

Bluetooth serial adapters are arranged to allow received Bluetooth signals to be output as serial signals, and received serial signals to be transmitted as Bluetooth signals.

The range extending apparatus may comprise a pair of Bluetooth serial adapters. The pair of Bluetooth serial adapters may be connected so that the serial output of one of the adapters forms the serial input to the other Bluetooth serial adapter.

Each Bluetooth to serial adapter may comprise a Bluetooth connection module for conducting Bluetooth communication with another Bluetooth enabled device, a serial connector suitable to accept a serial cable, and a serial to Bluetooth interface.

Where there is a pair of serial adapters these may be connected to one another via their respective serial connectors, with the RX (receive) pin on one connector connected to the TX (transmit) pin on the other connector and vice versa. The connection may be via a NULL modem cable.

One of the communication modules may be preconfigured as a Bluetooth slave. Another of the communication modules may be preconfigured as a Bluetooth master.

One of the communication modules may be configured to be discoverable and connectable on power up and to autoanswer incoming Bluetooth inquiries.

Said one of the communication modules may be arranged so as to be transparent once in a connected state so that any data arriving via the received Bluetooth RF packets are presented directly to the other communication module.

Said other communication module may be arranged so as to be transparent once in a connected state.

The Bluetooth range extending apparatus may be arranged so as to be transparent once a connection is made between two Bluetooth devices via the apparatus.

According to another aspect of the present invention there is provided a Bluetooth communication arrangement comprising two Bluetooth devices and at least one Bluetooth range extending apparatus of the type defined above and arranged for receiving Bluetooth signals from one of the Bluetooth devices and transmitting Bluetooth signals to the other of the Bluetooth devices.

According to another aspect of the present invention there is provided a method of Bluetooth communication between two Bluetooth devices using a Bluetooth range extending apparatus comprising the steps of:

transmitting Bluetooth signals carrying data from a first of the Bluetooth devices;

at the Bluetooth range extending apparatus, receiving said Bluetooth signals carrying data, extracting the carried data, re-encoding the extracted data, and transmitting corresponding outgoing Bluetooth signals; and receiving the corresponding outgoing Bluetooth signals at the other of the Bluetooth devices.

In this specification where data and the carrying of data is mentioned, this is used broadly to cover any type of information that may be transmitted via a Bluetooth connection. For example the data might comprise digital data generated and/or used by a computer (in the broad sense covering embedded processors and so on) or might comprise audio data/audio signals.

According to another aspect of the present invention there is provided a computer program comprising code portions which when loaded and run on a computer cause the computer to carryout a method as defined above.

According to another aspect of the present invention there is provided a computer program comprising code portions which when loaded and run on a computer arrange the computer as apparatus defined above.

The computer program may be carried by a computer readable data carrier, such as a signal, a floppy disc, a CD-ROM, a DVD-ROM a hard disc or another form of data storage.

BRIEF DESCRIPTION OF THE DRAWINGS

Embodiments of the present invention will now be described by way of example only with reference to the accompanying drawings in which.

DETAILED DESCRIPTION OF EMBODIMENTS OF THE INVENTION

Figure 1:
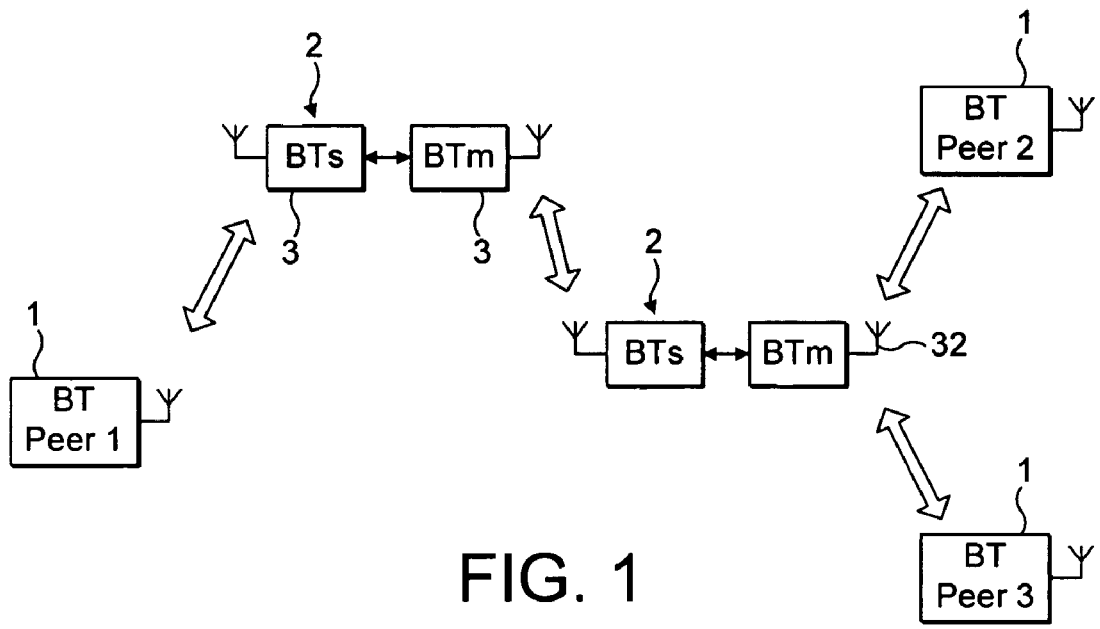
FIG. 1 shows a Bluetooth communication arrangement in which Bluetooth communication is initiated by a first Bluetooth device between two other Bluetooth devices.

FIG. 1 shows a Bluetooth communication arrangement comprising three Bluetooth enabled devices 1 which are arranged for communication with one another and are designated Peer 1, Peer 2 and Peer 3.

Two Bluetooth range extending apparatus 2 are disposed between the Bluetooth enabled devices 1 to facilitate Bluetooth communication between the Bluetooth enabled devices.

In this case it is to be imagined that the location of the Bluetooth enabled devices 1 is such that direct communication between these via a conventional Bluetooth connection is not possible because the range of such a connection is less than the spacing between the Bluetooth enabled devices 1. In the present embodiment the two Bluetooth range extending apparatus 2 enable communication to take place and can be considered to act as repeaters of the Bluetooth signals issued by each of the Bluetooth enabled devices 1.

In this instance Bluetooth signals are transmitted by a first Bluetooth device 1, Peer 1, and received by a first of the Bluetooth range extending apparatus 2. From there the signals are transmitted on to the second Bluetooth range extending apparatus 2 and from the second Bluetooth range extending apparatus 2, the signals are transmitted on to the correct location which in this instance is both of the other two enabled devices 1, Peer 2 and Peer 3. Similarly, as there is bi-directional communication between the Bluetooth devices 1, Bluetooth signals from Peers 2 and 3 pass back to Peer 1 via the two range extending apparatus 2 in succession.

It is important to note however, that when incoming Bluetooth signals are received by each range extending apparatus 2 the carried data is extracted from the Bluetooth signals and re-encoded by the range extending apparatus before being sent onwards to the next stage. That is to say the range extending apparatus 2 do not operate by repeating Bluetooth packets as defined at the radio level but rather repeat RFCOMM connections.

Figure 2:
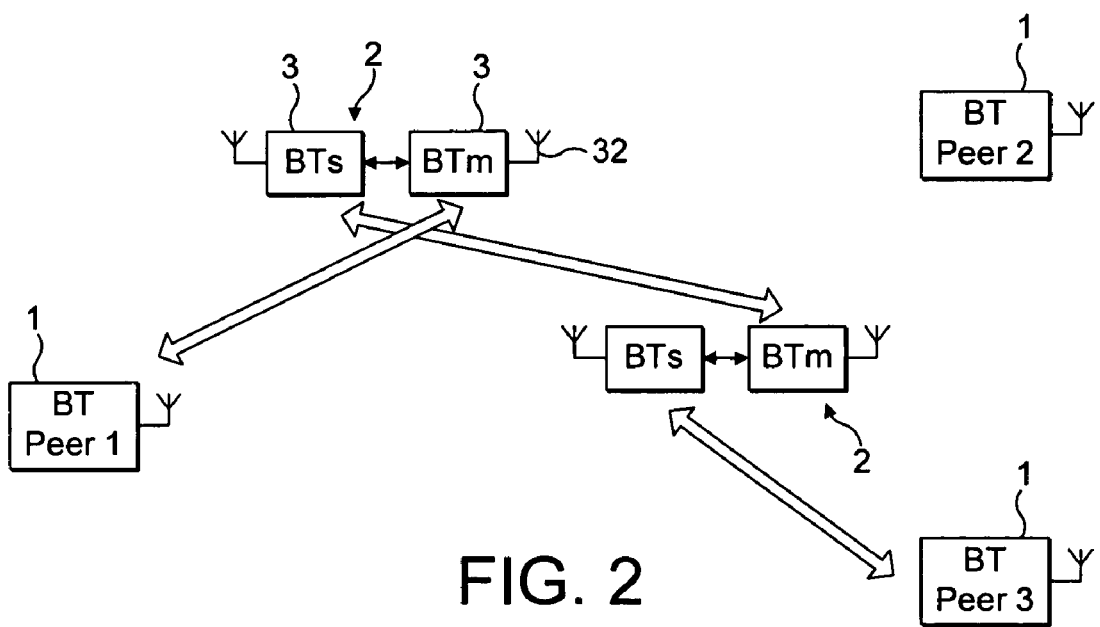
FIG. 2 shows the Bluetooth communication arrangement of FIG. 1 where a Bluetooth connection is initiated by one of the other Bluetooth devices.

FIG. 2 shows a different communication scenario in the same Bluetooth communication arrangement. In this case, Bluetooth device Peer 3 has initiated a Bluetooth connection with Bluetooth device Peer 1 and again this is routed through the two Bluetooth range extending apparatus 2. The significance of which of the Bluetooth peer devices initiates the Bluetooth connection will be explained in more detail below.

Figure 3:
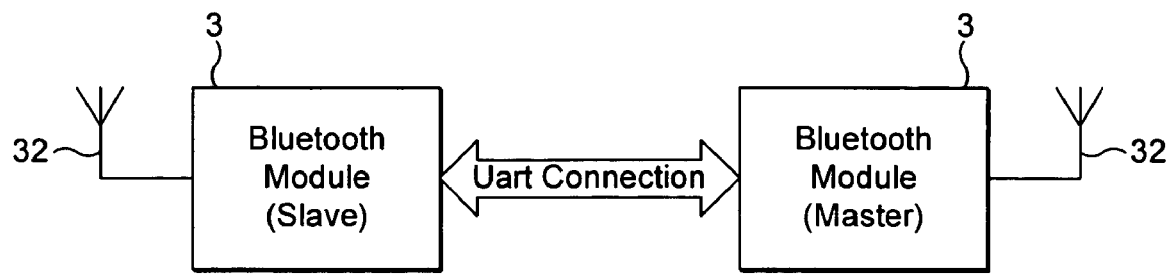
FIG. 3 shows a Bluetooth range extending apparatus of the Bluetooth communication arrangement shown in FIGS. 1 and 2.
Figure 4:
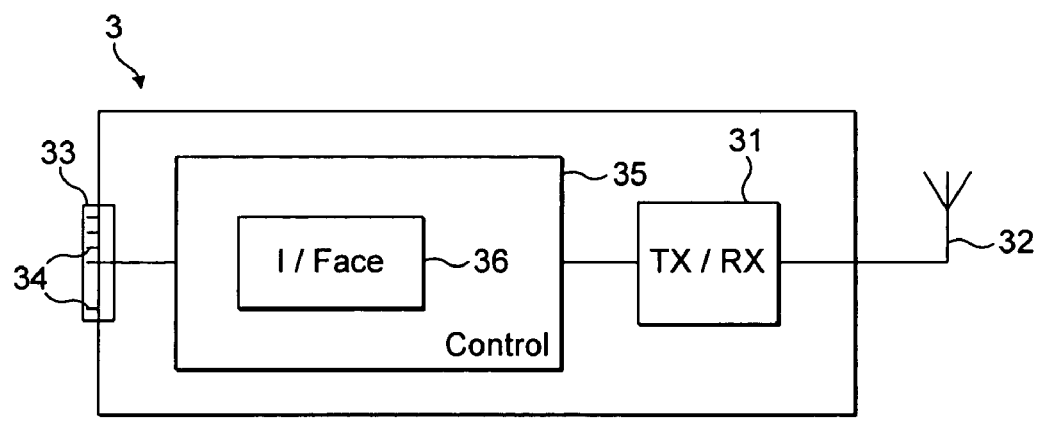
FIG. 4 shows a Bluetooth serial adapter which forms part of the Bluetooth range extending apparatus shown in FIG. 3.

The structure and operation of the two Bluetooth range extending apparatus 2 in FIGS. 1 and 2 are the same and one such Bluetooth range extending apparatus is shown in more detail in FIG. 3. Each Bluetooth range extending apparatus 2, comprises two Bluetooth serial adapter modules 3 which are connected back to back to one another via a Uart (Universal Asynchronous Receiver Transmitter) connection.

Each Bluetooth serial adapter module 3 comprises a Bluetooth connection module 31 with an associated antenna 32 for the transmission and reception of Bluetooth signals, a serial connector 33 including a plurality of terminals 34 for outputting and receiving serial signals, and a control unit 35 arranged for controlling the operation of the Bluetooth serial adapter module 3 and including a serial to Bluetooth interface for converting serial signals to Bluetooth signals and vice versa.

In practice, the two Bluetooth serial adapter modules 3 are connected to one another via their respective serial connectors 33, and in particular connections are made between the terminals 34 such that the TX (transmit) pin in one of the modules 3 is connected to the RX (receive) pin in the other module 3 and vice versa; the RTS (request to send) pin in one module 3 is connected to the CTS (clear to send) pin in the other module and vice versa; and the DSR (data set ready) pin in each module 3 is connected to ground.

To function correctly as a Bluetooth range extending apparatus or "repeater", a first of the Bluetooth serial adapters 3 in each range extending apparatus is preconfigured as a slave (designated as BTs in FIGS. 1 and 2) and the other module 3 is preconfigured as a master (designated by BTm in FIGS. 1 and 2).

The slave unit is configured to be discoverable and connectable on power up and to auto answer incoming Bluetooth inquiries. However, once the slave is in a connect state it becomes transparent and any data arriving via an RF Bluetooth packet are immediately presented at the serial connector 33 of the slave module 3 which is then seen by the master module 3 via its serial connector 33. If the master module 3 is not in the connect state then the received data will be parsed for AT commands. On the other hand, if the master module 3 is in the connect state the received data is re-encoded into Bluetooth signals and transmitted onwards from the respective antenna 32.

At any time the Bluetooth range extending apparatus can be in one of three states defined as follows:

|         | Slave                                                        | Master                                                       |
|---------|--------------------------------------------------------------|--------------------------------------------------------------|
| State 1 | Waiting for Connection and discoverable. Responds to inquiries | Idle, Not discoverable and Not connectable. Does not respond to inquiries |
| State 2 | Connected. Serial port transparently connected to RF         | Idle, Not discoverable and Not connectable. Does not respond to inquiries |
| State 3 | Connected. Serial port transparently connected to RF         | Connected. Serial port transparently connected to RF         |

In State 1 the range extending apparatus 2, as an entity, is discoverable by Bluetooth inquiries receivable at the slave module 3 and is waiting for a connection so that it can provide the services of the master module 3 as a proxy for performing inquiries and connections from its location. This means that if, for example, in the arrangement shown in FIG. 1 and FIG. 2 Bluetooth device Peer 1 wants to make a connection to Bluetooth device Peer 2, and upon performing a Bluetooth inquiry, Bluetooth device Peer 1 does not find Bluetooth device Peer 2 in range, but on the other hand does find one of the Bluetooth range extending apparatus 2, the Bluetooth range extending apparatus 2 can be involved in the connection. In particular, Bluetooth device Peer 1 can initiate a connection with the Bluetooth range extending apparatus 2 and the slave module 3 in the Bluetooth range extending apparatus 2 will accept the inquiry and allow a connection to be made between Bluetooth device Peer 1 and itself. Once this connection is made then based on the information which is received via the slave module 3, the master module 3 in that Bluetooth range extending apparatus 2 may act as a proxy master and perform a proxy inquiry looking for Bluetooth device Peer 2. If Bluetooth Peer device 2 is found at this stage the master module 3 proceeds to make a proxy connection by sending appropriate connection commands. As soon as there is a connection between the master module 3 acting as a proxy master and Bluetooth device Peer 2, any data sent from Bluetooth device Peer 1 will be seen by Bluetooth device Peer 2 and vice versa. Thus, in effect there will be Bluetooth communication between Bluetooth device Peer 1 and Bluetooth device Peer 2. However, this will take place via the Bluetooth range extending apparatus 2 and the Bluetooth signals will be decoded and the data re-encoded in another Bluetooth signal as the data passes in each direction through the Bluetooth range extending apparatus.

It will be appreciated that if the first Bluetooth range extending apparatus 2 fails to find the correct Bluetooth device 1 but rather finds another Bluetooth range extending apparatus 2, the above connection making process can be repeated through that Bluetooth range extending apparatus 2 with the objective of finding the ultimately targetted Bluetooth device.

From a technical point of view there is basically no limit to the number of Bluetooth range extending apparatus 2 which may be used in a chain between two Bluetooth devices 1 which wish to communicate with one another. However, there is a time delay of perhaps 10 milliseconds or so, involved in the processing necessary at each Bluetooth range extending apparatus 2. Therefore, the cumulative time delay will, in most circumstances, set a practical limit on how many links in the chain there may be.

In the arrangement shown in FIG. 1, it can be seen that Bluetooth device Peer 1 initiated the Bluetooth connection with Bluetooth devices Peer 2 and Peer 3 since Bluetooth device Peer 1 is communicating via Bluetooth signals with the Bluetooth slave module 3 in the first Bluetooth range extending apparatus 2 and correspondingly the other Bluetooth devices Peer 2 and Peer 3 are communicating via Bluetooth signals with the master module 3 in the second Bluetooth range extending apparatus.

On the contrary in the situation shown in FIG. 2, Bluetooth device Peer 3 is communicating with the slave module 3 in the second Bluetooth range extending apparatus 2. Therefore it can be seen that Bluetooth device Peer 3 initiated this connection with Bluetooth device Peer 1 which is communicating via with the master module 3 in the first Bluetooth range extending apparatus 2.

It will be recognised that once a Bluetooth connection is established, Bluetooth signals can be transmitted in either direction along the whole chain including the Bluetooth range extending apparatus 2 and at this point there is no difference in operation between the slave module 3 and the master module 3. It is only during the making of the initial connection that the difference in functionality between these two modules 3 is important.

A particular advantage of the present system is that the range extending apparatus may be implemented making use of Bluetooth serial adapter modules which are of relatively low cost and have limited Bluetooth functionality. The alternative would be to make use of complex computer controlled Bluetooth enabled devices having full functionality in the range extending apparatus. Clearly the use of the simpler and cheaper components helps make the use of Bluetooth range extending apparatus commercially practical.

One such type of Bluetooth serial adaptor module which may be used in the Bluetooth range extending apparatus is TDK's Bluetooth Intelligent Serial Module or BISM which are commercially available from TDK Systems Europe Limited of 126 Colindale Avenue, London NW9 5HD.

Where TDK Bluetooth Intelligent Serial Modules are used, the module which is to be preconfigured as a slave in the Bluetooth range extending apparatus may be preconfigured using the following commands:

ATS0=1
ATS504=1
ATS512=7
AT&W
AT+BTN="TDK Repeater"
ATS520=460800 whereas the Bluetooth Intelligent serial module which is to be used as the master may be preconfigured using the following command:

ATS520=460800

It should be noted that the mode of operation of the Bluetooth range extending apparatus of the present kind is such that no modification need be made to the Bluetooth devices (eg Peers 1, 2 or 3) between which Bluetooth communication ultimately needs to be set up and the existence of any Bluetooth range extending apparatus 2 in a connection between such Bluetooth Peer devices is transparent once the connection has been made. To put this another way, if there are two or more Bluetooth devices which need to communicate with one another and these are disposed such that once a Bluetooth range extending apparatus is disposed in an appropriate location there is sufficient range provided by the two Bluetooth links in the chain, a connection can be made in exactly the same way as if the Bluetooth range extending apparatus was not there, as far as the two Bluetooth devices 1 are concerned.

There are a range of different applications to which such Bluetooth range extending devices 2 may be put. In one case they may be used in a factory or another relatively large building where two Bluetooth enabled devices which need to communicate to each other do not have sufficient range. Thus, if there are a large number of machines whose operation needs to be monitored and/or controlled throughout a factory from a central location, strategic placing of Bluetooth range extending apparatus 2 of the present kind may facilitate this.

In another case the Bluetooth range extending apparatus may be used to extend the range of communication between a Bluetooth enabled mobile telephone and a Bluetooth enabled computer which needs to make use of the phone connection provided by the phone. This might be, for example, to connect to the Internet or another network.

In a particular instance an operative who uses a portable computer whilst out in the field and who needs to connect to a remote computer system, may leave the telephone which he is using in a car, together with a Bluetooth range extending apparatus 2 and take the portable computer with him or her into a house or another building in order to use it whilst still being able to access the remote computer system via the phone connection. This can be useful because the range provided by the Bluetooth range extending apparatus 2 can be significantly greater than that provided by the standard Bluetooth transceiver in a Bluetooth enabled telephone. At the same time it enables the operative to leave their telephone in his or her car where adequate mobile telephone reception is more likely to be achieved.

As will be appreciated, as well as the methods and apparatus described above, the invention may be embodied in software arranged to cause a computer (in the broad sense) to carry out the steps described above or to provide, in some senses "complete", an apparatus for carrying out the invention.

Such software may be carried on any suitable form of data carrier such as a signal, a floppy disc, a hard disc, a CD-ROM, a DVD-ROM or so on.

The invention claimed is:

1. Bluetooth range extending apparatus for extending the range of Bluetooth communication between a master device and an associated slave device, the apparatus comprising a first communication module which, in use, receives incoming Bluetooth signals carrying data and which extracts the carried data, and a second communication module which, in use, re-encodes the extracted data and transmits corresponding outgoing Bluetooth signals, wherein the first communication module is a transceiver module which is arranged to transmit Bluetooth signals as well as to receive Bluetooth signals, and the second communication module is a transceiver module which is arranged to receive Bluetooth signals as well as to transmit Bluetooth signals and one communication module is preconfigured as a Bluetooth slave, and the other communication module is preconfigured as a Bluetooth master, wherein the first communication module comprises a Bluetooth serial adapter which is arranged to act as a translator between Bluetooth signals and serial signals, and the second communication module comprises a Bluetooth serial adapter which is arranged to act as a translator between Bluetooth signals and serial signals, wherein one Bluetooth serial adapter is preconfigured as a slave and the other Bluetooth serial adapter is preconfigured as a master, wherein the two Bluetooth serial adapters incorporate a plurality of connectors; at least two connectors are connected so that a serial output of one of the adapters forms a serial input to the other Bluetooth serial adapter.

2. A Bluetooth range extending apparatus according to claim 1, wherein each Bluetooth to serial adapter comprises a Bluetooth connection module which conducts Bluetooth communication with another Bluetooth enabled device, a serial connector suitable to accept a serial cable, and a serial to Bluetooth interface.

3. A Bluetooth range extending apparatus according to claim 2, wherein the two Bluetooth serial adapters are connected to one another via their respective serial connectors, with a RX (receive) pin on one connector connected to a TX (transmit) pin on the other connector and vice versa.

4. A Bluetooth range extending apparatus according to claim 1, wherein a communication module is configured to be discoverable and connectable on power up and to autoanswer incoming Bluetooth inquiries.

5. A Bluetooth range extending apparatus according to claim 4, wherein said communication module is arranged so as to be transparent once in a connected state so that any data arriving via the received Bluetooth RF packets are presented directly to the other communication module.

6. A Bluetooth range extending apparatus according to claim 5, wherein said other communication module is arranged so as to be transparent once in a connected state.

7. A Bluetooth range extending apparatus according to claim 1, wherein the Bluetooth range extending apparatus is arranged so as to be transparent once a connection is made between two Bluetooth devices via the apparatus.

8. A Bluetooth range extending apparatus according to claim 1, wherein said Bluetooth serial adapters are connected back to back.

* * * * *

UNITED STATES PATENT AND TRADEMARK OFFICE
CERTIFICATE OF CORRECTION

PATENT NO. : 7,613,425 B2  Page 1 of 1
APPLICATION NO. : 11/006520
DATED : November 3, 2009
INVENTOR(S) : Mahendra J Tailor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Nineteenth Day of October, 2010

David J. Kappos
*Director of the United States Patent and Trademark Office*